March 22, 1938.                E. W. BLEAM                  2,111,921
                        AUTOMATIC WEIGHING APPARATUS
                          Filed April 28, 1933         6 Sheets-Sheet 1

INVENTOR.
Edgar W. Bleam
By Cornelius L. Ehret
         his ATTORNEY.

March 22, 1938.  E. W. BLEAM  2,111,921
AUTOMATIC WEIGHING APPARATUS
Filed April 28, 1933  6 Sheets-Sheet 2
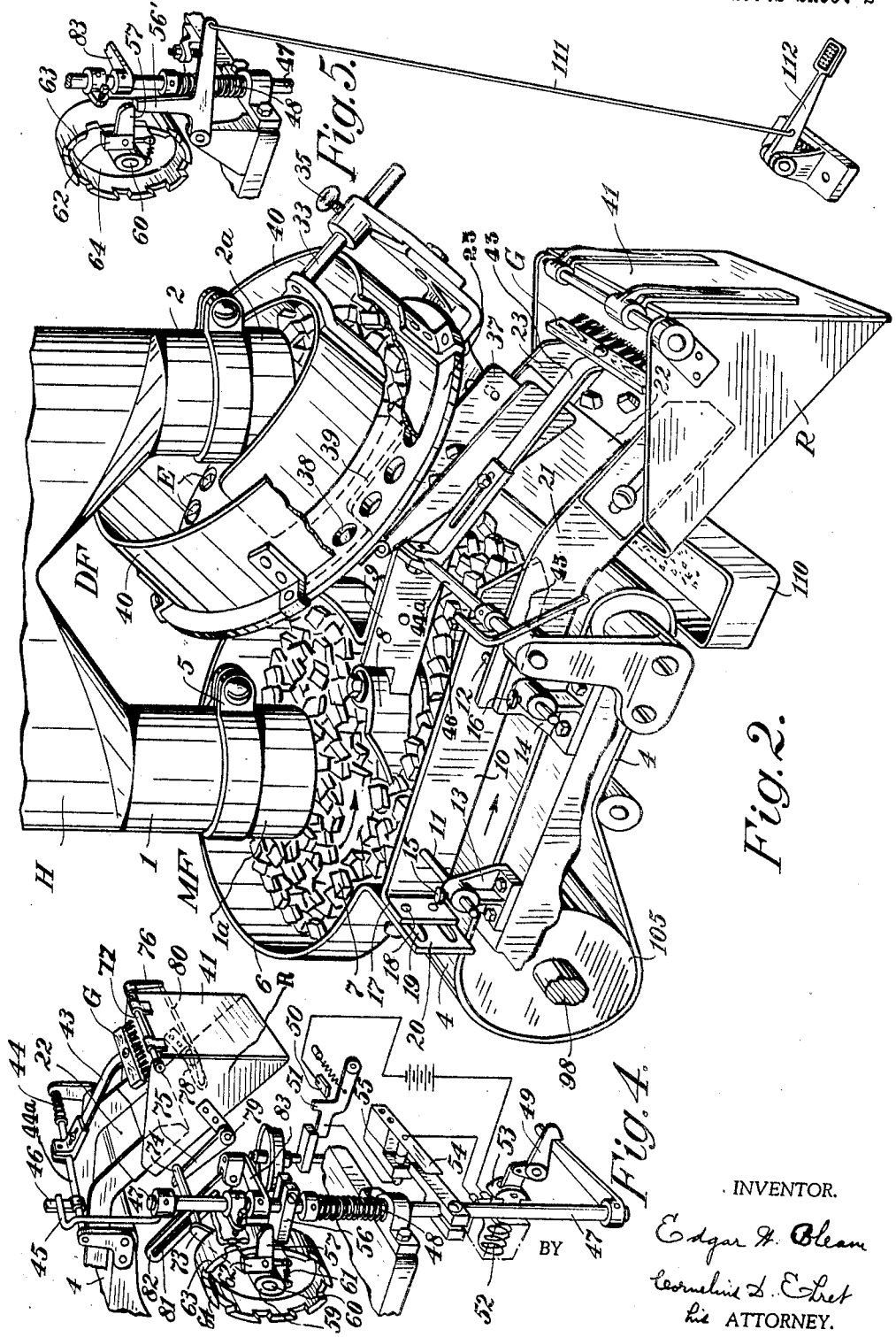
INVENTOR.
Edgar W. Bleam
BY Cornelius D. Ehret
his ATTORNEY.

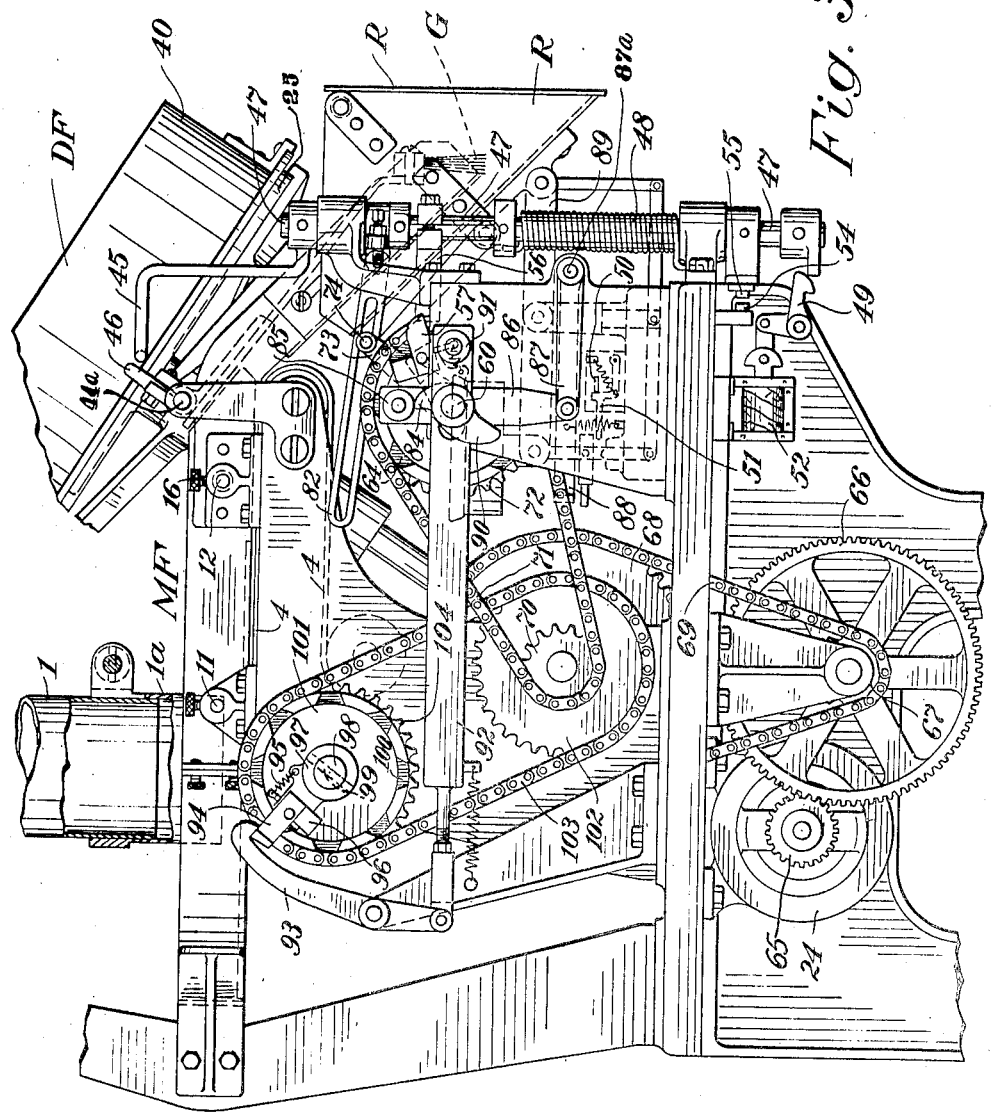

March 22, 1938.  E. W. BLEAM  2,111,921
AUTOMATIC WEIGHING APPARATUS
Filed April 28, 1933   6 Sheets-Sheet 4

INVENTOR.
Edgar W. Bleam
BY
Cornelius D. Ehret
ATTORNEY.

March 22, 1938.  E. W. BLEAM  2,111,921
AUTOMATIC WEIGHING APPARATUS
Filed April 28, 1933   6 Sheets-Sheet 5

INVENTOR.
Edgar H. Bleam
BY
Cornelius D. Ehret
his ATTORNEY.

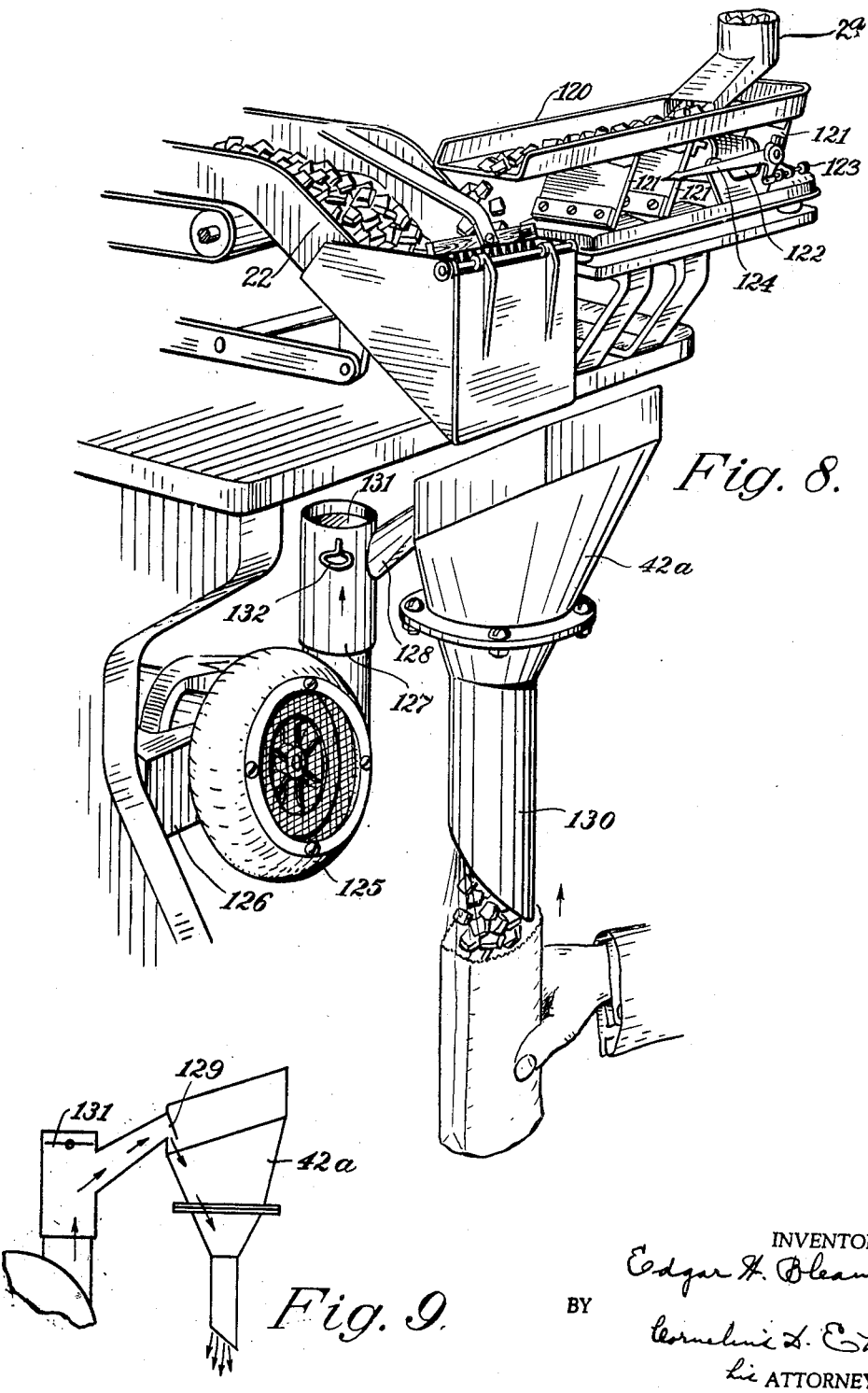

Patented Mar. 22, 1938

2,111,921

UNITED STATES PATENT OFFICE 2,111,921

AUTOMATIC WEIGHING APPARATUS

Edgar W. Bleam, Philadelphia, Pa., assignor to Stokes and Smith Company, Philadelphia, Pa., a corporation of Pennsylvania Application April 28, 1933, Serial No. 668,333

4 Claims. (Cl. 249—42)

My invention relates to apparatus for automatically weighing and delivering solid materials, such as nuts, seeds, nut meats, candies of uniform or odd shapes, short-cut macaroni or spaghetti, cereals, washers, bolts, etc., of widely varying characters, sizes and shapes.

In accordance with my invention, the material may be fed by a conveyor to a chute, or equivalent, discharging into the receiving receptacle of a scale which immediately upon attaining balance effects movement of structure, preferably a brush, to arrest material about to enter the receptacle from the chute.

In some forms of the invention, the conveyor runs continuously, whereas in other forms the conveyor is stopped after the correct or nearly the correct amount has been fed to the receptacle; in a preferred form, the conveyor quickly feeds all but a few percent of the desired weight and then stops, the exact weight being obtained by a dribble-feed device which preferably, though not necessarily, runs continuously.

My invention also resides in the features of combination, construction and arrangement hereinafter described and claimed.

For an understanding of my invention and for illustration of specific modifications thereof, reference is to be had to the accompanying drawings in which:

Fig. 1 is a side elevational view of weighing and delivering apparatus.

Fig. 2, on enlarged scale, and in perspective, illustrates details of the feeding mechanism of Fig. 1.

Fig. 3 is a detail view on enlarged scale, of the driving and control apparatus for the mechanism shown in Fig. 2.

Fig. 4, in perspective, diagrammatically illustrates automatic clutch tripping mechanism.

Fig. 5, in perspective, illustrates a modification of a pedal-trip clutch.

Figure 6:
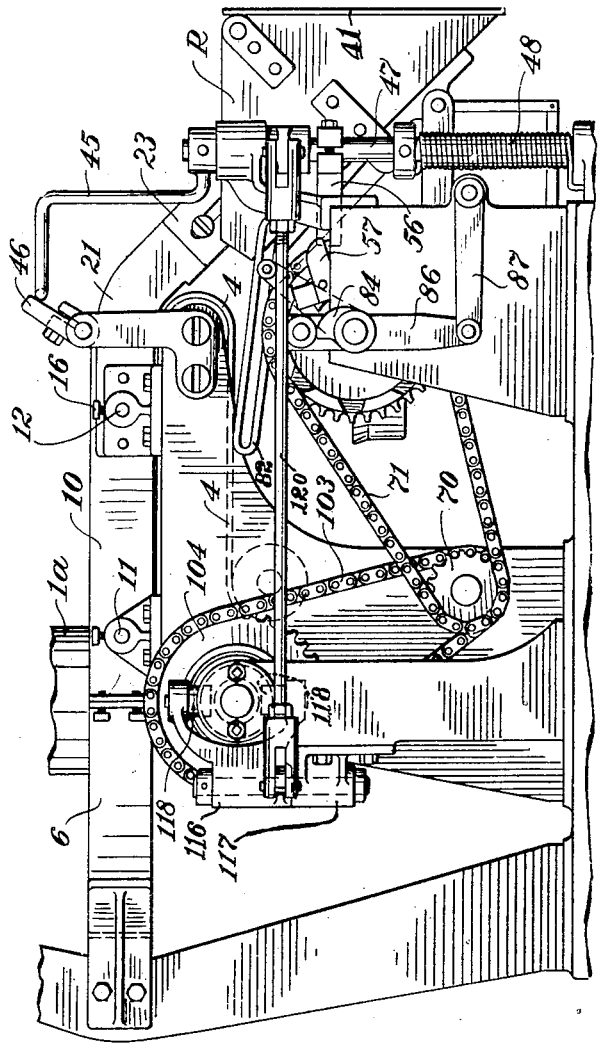

Fig. 6 is a detail view on enlarged scale, of a modified type of conveyor feed.

Figure 7:
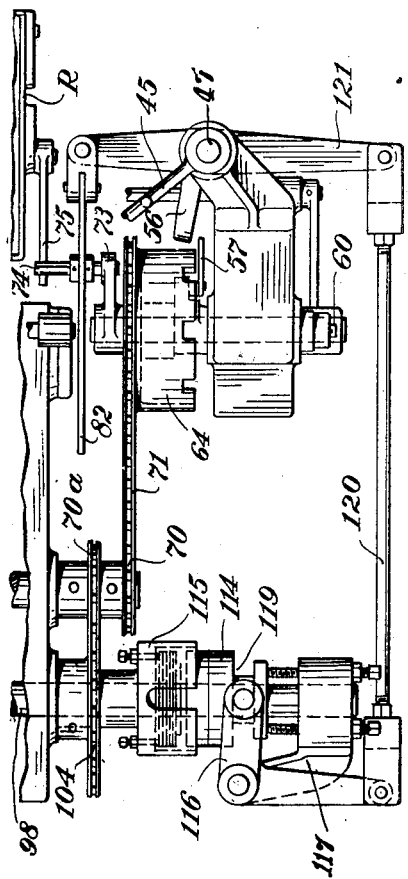

Fig. 7 is a top plan view of parts shown in Fig. 6.

Figure 1:
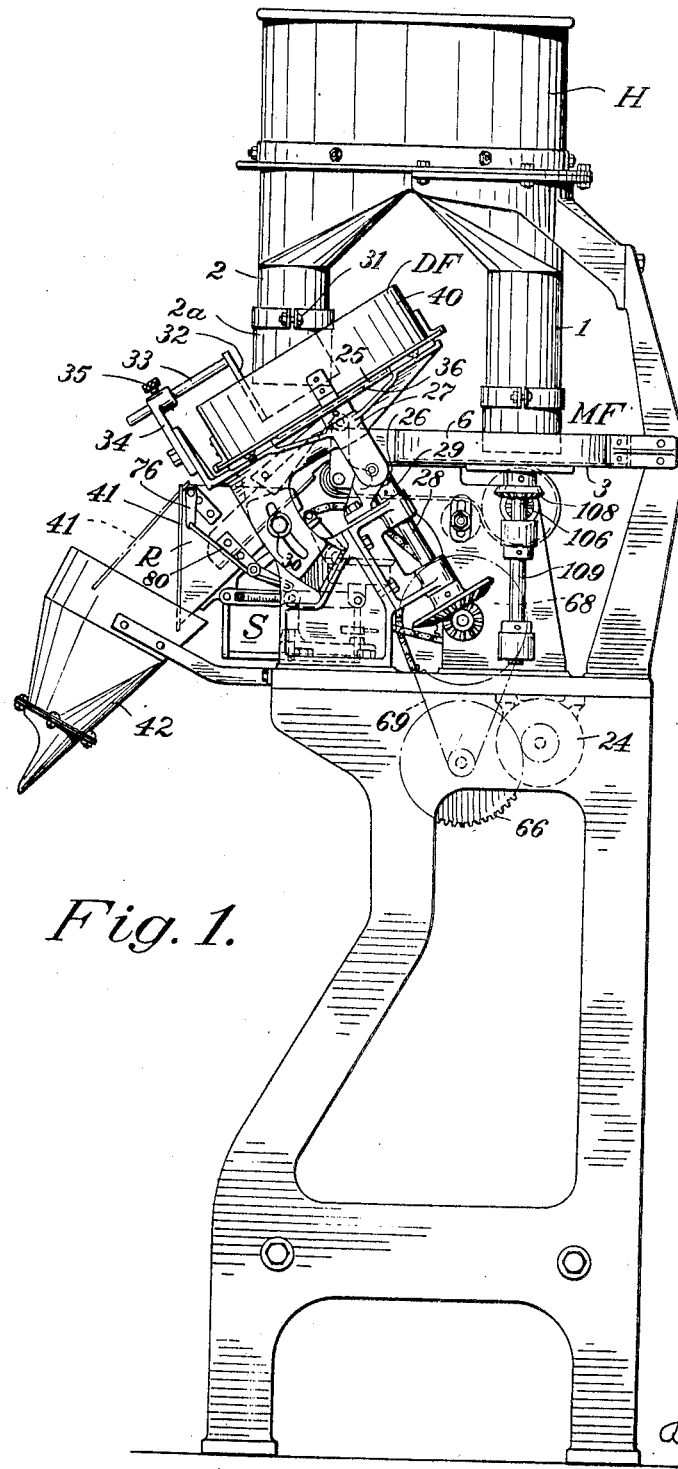

Fig. 8 in perspective illustrates a modification of mechanism shown in Figs. 1 and 2.

Fig. 9 illustrates diagrammatically a pneumatic bag opening device included in Fig. 8.

Referring particularly to Figs. 1 and 2, the hopper H containing the material to be weighed is preferably divided, so that one stream of the material passes through the conduit 1 to the main feeding device MF, and another stream passes through conduit 2 to the dribble feed mechanism DF. The outputs of these feeding devices, regulated as hereinafter described, pass into the container R of a scale S.

The main feed device comprises the disk 3 directly below the conduit 1 of hopper H, and the conveyor belt 4, whose upper lift receives the material M from disk 3. The telescoping end 1a of the conduit 1 is adjustably held as by clamp 5 at a suitable distance above the surface of the disk 3 to regulate the feed of the material M to the disk. The stationary member 6 provides a barrier preventing the material from moving off the disk except at the opening or gap 7 preferably variable in extent by adjustment of the gate member 8. The barrier members 9, 10 extending in the direction of travel of the conveyor 4 form continuations of the barrier 6. At least one of them, barrier element 10 for example, is adjustable to permit variation of the width of the stream of material on the conveyor 4. As shown, this element may be supported by the rods 11, 12 extending through the stationary brackets 13, 14, and adjustably held as by the bolts 15, 16. The rear end of the barrier may, as indicated, be provided with an offset extension 17 to receive bolts 18 which pass through the slots 19 of the extension 20 of barrier 6.

The bracket 14, and a similar bracket on the opposite side of the conveyor support the frame members 21 of the chute 22 which directs the material from the conveyor into the receptacle R. The chute is preferably provided with an adjustable end 23, to permit adjustment of the effective length of the chute. The main feed mechanism is driven from motor 24 as hereinafter described.

The dribble feed device comprises a disk 25 also driven from motor 24, and preferably continuously. The shaft 26 of disk 25 is journaled in the pivoted bracket 27 and connected to its driving shaft through a universal joint 29. The angle of the axis of rotation of disk 25 can therefore be adjusted by loosening the clamping bolt 30 from bracket 27, tilting the bracket to the desired position, and retightening bolt 30. The feed of the material to the disk is controllable by adjustment of the telescoping end 2a of conduit 2 which can be held in position by tightening of clamp 31, and also by the arcuate barrier member 32 which is supported by the rod 33 adjustably held to bracket 34 by the clamping bolt 35. The disk 25 is provided with a plurality of openings 38 suitable to receive one element E of the mass of material M so that as the disk revolves underneath the accumulation or pile below the conduit 2, each of these openings will receive one element. The disk 25 revolves above and in contact with or closely adjacent to a plate 36 whose surface is unbroken except at the discharge region above the chute 37, so that the elements E within the openings 38 of disk 25 are retained until they pass above the discharge opening 39 of plate 36. The guard ring 40 is preferably attached to and rotatable with the disk 25 as this provision tends to keep the accumulation of material in agitation and facilitate the movement of elements E into the openings 38.

With the specific mechanism thus far described, the main feed is so adjusted that during the portion of the cycle for which the main feed is effective, the amount of material fed into the container R is slightly less than the amount required to effect balance of the scale S, i. e., a large percentage of the amount desired is received by the container R within a short space of time. The additional slight amount necessary is received from the dribble feed device which continues to add additional elements E one at a time so that the degree of accuracy is very high. The extension 23 of the chute is adjusted so that it is only slightly above the level of the material when the desired weight thereof is in the container R; this contributes to steadiness of the scale. When exactly the correct amount to obtain balance is in the receptacle R, the movement of the scale arm to balanced position effects, as through a control system hereinafter specifically described, downward movement of the gate member G, preferably a brush, to obstruct the chute 21 and prevent further flow of material.

It is not necessary to discontinue the dribble feed because the additional elements E of material, comparatively few in number, simply accumulate behind the brush G and are added to the bulk delivered by the next operation of the main feeding device.

With the brush or gate G closed, the door 41 for the receptacle R is opened by mechanism hereinafter described to discharge the weighed material into a suitable container held below the funnel or spout 42 by an operator, or transported thereto by suitable conveying mechanism.

The brush arm 43 is normally held in the raised position against the bias of spring 44 (Fig. 4) by the bar 45 which engages the finger 46 secured to shaft 44a. Bar 45 is secured to the upper end of the shaft 47 which is biased for rotation from the position shown in Fig. 4 by the spring 48 but is restrained from such movement by the latch 49.

When the scale is balanced, it effects or permits closure of the contacts 50, 51 to complete a circuit including the solenoid or electromagnet 52, the movement of whose armature 53 effects tripping of the latch 49.

The release of shaft 47 for movement by spring 48 swings the bar 45 away from finger 46 permitting the brush G to be swung by the spring 44 to discontinue the flow. The rotation of the shaft 47 also effects separation of the contacts 54, 55 to de-energize the solenoid notwithstanding continued engagement of the scale-contacts 50, 51. The rotation of shaft 47 also moves the stop 56 out of engagement with the finger 57 pivotally mounted upon the bracket 59 secured to shaft 60, so that spring 61 swings the clutch member 62 attached to or integral with finger 57 into the path of one of the abutments 63 of the driving clutch member 64 which is constantly rotated by motor 24 through the gears 65, 66, (Fig. 3) sprockets 67, 68, chain 69, sprocket 70, chain 71 and sprocket 72.

The arm 73 attached to shaft 60 rotates in clockwise direction as viewed in Fig. 4, the pin 74 extending therefrom engaging the lever 75 to open the door 41 of the bucket R through linkage comprising the arm 76 connected to the shaft 77 of the door, the arm 78 attached to the shaft 79 and the link 80. As indicated, the link 80 is substantially on dead center when the door is closed. Continued rotation of arm 73 causes the pin 74 to pass beyond the end of arm 75 whereupon the door 41 swings closed, the arm 73 continuing its rotation until the pin 74 again comes in position above arm 75.

During the latter part of the rotation of arm 73, pin 74 engages the end of a slot 81 of the member 82 pivoted to the arm 83 secured to shaft 47, so that shaft 47 is returned to the position shown in Fig. 4; the latch 49 substantially upon completion of the movement drops into position to relatch the shaft 47.

The cam 84 (Fig. 3) secured to shaft 60 engages the roller 85 secured to the upper end of the sliding member 86 whose lower end is connected to arm 87, to lift the member 88 attached to the same shaft 87a as arm 87 from the position for which it locks or prevents movement of the scale beam 89. This release of the scale beam is preferably effected just before the beginning of the effective dribble feed, i. e., just before completion of the main feeding period.

The cam 90 secured to shaft 60 engages the roll 91 to move the slidable bar 92 to the right, as viewed in Fig. 3, to move the latch 93 out of engagement with the clutch member 94, so that the spring 95 is effective to move the driven member 96 of the clutch, which is secured to bracket 97 held fast to the shaft 98 as by pin 99, into the path of the teeth 100 of the driven clutch member 101. The motor 24 effects continuous drive of the driving clutch member 101 through the sprocket 102, which is secured to the same shaft as sprocket 70, chain 103, and sprocket 104. To the shaft 98 is affixed the driving roll 105 (Fig. 2) of the conveyor belt 4, and also the gear 106 (Fig. 1) which engages gear 108 on shaft 109 to drive the main feed disk 3. As appears from Fig. 3, after shaft 98 has made one revolution, the finger 94 again engages the latch 93, which in the meantime has returned to its original position, whereby the driven member 96 is rocked out of engagement with the driving clutch member, to effect discontinuance of the main feed. The duration of the main feeding movement is therefore definite and fixed. The amount of material transferred during this movement is controllable by the several expedients previously described. The duration of the dribble feed on the contrary is determined solely by the apparatus itself, i. e., the dribble feed continues until the scale is balanced. Briefly, the main feed is initiated by the cam 90 of shaft 60 and terminates when shaft 98 has made one revolution. Shaft 60 is arrested when the finger 57 engages stop 56 and its rotation is initiated when the solenoid 52 is energized, i. e., upon balance of the scale and cessation of the dribble feed. The cycle of operation repeats so long as the motor 24 remains energized. The time per cycle however, may not be constant but may vary for different cycles because the initiation of each cycle is determined by the machine itself, i. e., when the proper weight is received by the container R. With apparatus of the type shown the speed of thirty weighing operations per minute is not difficult to obtain, although speed will vary depending upon the character of the material, the accuracy desired, and the quantity to be weighed per cycle.

Preferably and as indicated, there is a gap between the end of the conveyor 4 and the receiving end of the chute 21 which is jumped by the elements E of the mass due to their inertia. However, the broken pieces, chips, etc., being lighter, do not possess sufficient momentum and drop through the gap into a suitable waste receptacle 110. Therefore, the mechanism serves to clean the material at the same time that it is delivering it to be weighed. This is particularly of importance when the material weighed is hard candies, for the broken pieces and powder often run to a substantial percentage.

Figure 3A:
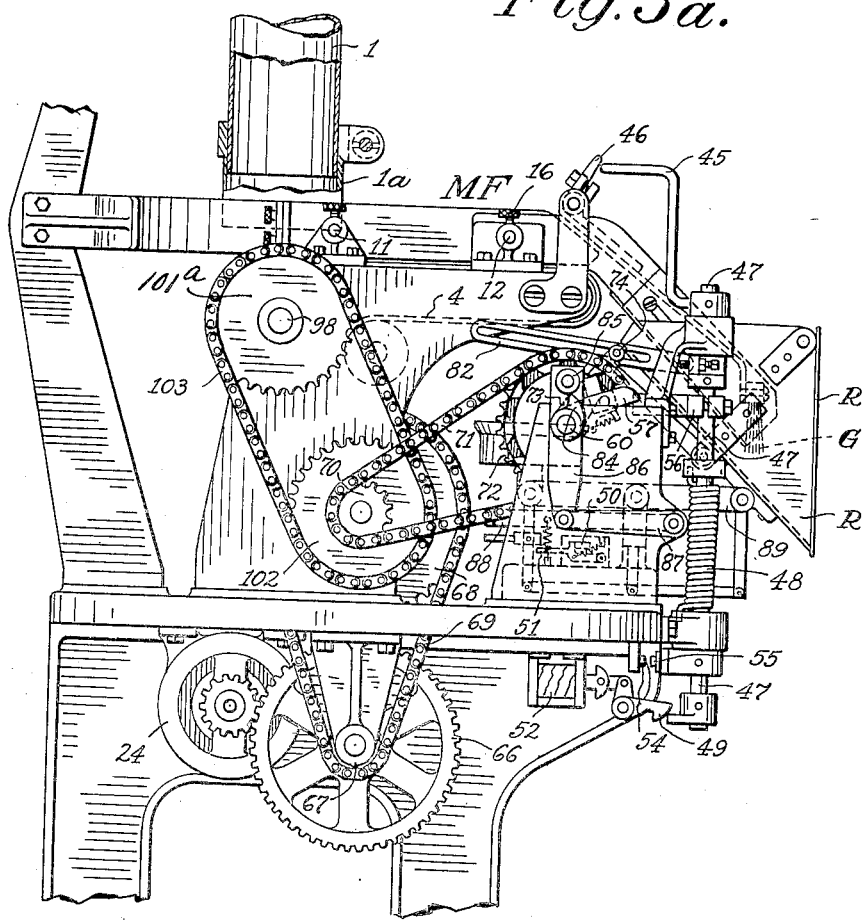
Fig. 3a is a modification of the mechanism shown in Fig. 3.

In some cases it may be desirable to modify the mechanism so that it will perform one cycle of operations and then stop, the operator tripping the machine to cause it to go through the next cycle. In this modification, a portion of which is shown in Fig. 5, the clutch finger 57 is not controlled by shaft 47 but instead engages the arm 56' connected through link 111 to the treadle 112. When the treadle is depressed the arm 57 is released and the machine goes through its cycle as above described and will repeat so long as the treadle is held depressed. If the treadle is depressed only momentarily the machine stops at the end of one cycle.

Where the degree of accuracy desired is not so high as to require the dribble feed, this attachment may be dispensed with, and the main feed allowed to run continuously, i. e., the mechanism shown in Fig. 3 can be converted simply by removal of the latch 93, or of course a sprocket directly connected to shaft 98 may be substituted for the clutch members. With this modification, shown in Fig. 3a with sprocket 101a directly connected to shaft 98, the material will flow continuously off the conveyor and will discharge into the container R until the weight is sufficient to cause the scale beam to operate the solenoid contacts allowing the brush G to descend. The mechanism then, as above described, effects discharge of the contents of the container, by opening door 41; the door is subsequently reclosed and the cycle repeats upon lifting of brush G. Because the main conveyor continues to run while the brush G is down, when the brush is next lifted there is at first discharge of a considerable accumulation, and thereafter the rate of discharge is that of the conveyor belt.

With the modification shown in Figs. 6 and 7 the dribble feed is again dispensed with, and the main conveyor 4 is stopped each time the desired weight is obtained. With this modification the rate of discharge into the receptacle is constant, and is not for each weighing, first substantially high, and thereafter at much lower rate. The elements having the same purpose or construction as in the preceding modifications are identified by like reference characters. The principal difference between this modification and those previously described is that the clutch controlling the rotation of shaft 98 is of the friction type and is directly controlled from the balanced scale rather than through shaft 60. The drive for shaft 98 includes the sprocket 70a rotatable with sprocket 70. The driven clutch member 114 is normally held out of engagement with the driving clutch member 115. One end of the bell crank lever 116, which is pivoted to the bracket 117 of the frame of the machine, is provided with rollers 118 which extend into the groove 119 of the driven clutch member, and to the other arm of the lever is pivoted the link 120 connecting to the arm 121 which is fastened to shaft 47. The operation of the modification is believed clear in view of the preceding description. Briefly, when the shaft 47 is released, as above described, the link 120 is moved to the left, as viewed in Fig. 7, to withdraw the driven clutch member 114 from the driving clutch member 115 to stop feeding movement of the conveyor. Simultaneously, as above described, the brush G descends to stop the material which has left the belt and is in the chute.

In Fig. 8 is shown another type of dribble feed suitable for use with any of the arrangements previously described. The trough 120 which receives material from the conduit 2a of a hopper, or equivalent, is resiliently supported by the flexible plates 121 for vibration by the solenoid or electromagnet 122 energized by alternating or pulsating current.

The shaking or vibration of the trough effects movement of the material toward the open or discharge end for delivery of a small stream of material to chute 22 so that in general, it performs the same function as the dribble feed device DF of preceding modifications. The rate of feed can be varied by adjustment of the amplitude of vibration, for example the screw 123 can be manipulated to vary the air gap between the magnet 122 and its armature carried or formed by the central plate 121, the pointer 124 indicating the amplitude adjustment. Specifically, the electromagnet 122 may be adjusted angularly about a pivot to change the air gap.

Preferably, the vibrating conveyor operates so long as the weighing machine is in operation, for example, the solenoid 122 may be energized concurrently with energization of motor 24.

In Figs. 8 and 9, there is also shown a modification of the structure for directing the weighed amounts of material to the bags to be filled. In many instances the bags are flat or collapsed and must be opened before they receive the weighed material. The speed of operation of the weighing device described is so high that it is practically impossible if the machine is running as a full-automatic device, for an operator to open the bags quickly enough to get them in position before door 41 is operated by the self-tripping mechanism of the machine. "Cellophane" bags in particular are difficult to open because the edges of the open end are flush and not provided with any offset or notch to facilitate their separation for opening of the mouth of the bag.

The blower 125, suitably driven as by motor 126, delivers a stream of air through duct 127 and pipe 128 to the funnel 42a which is provided with a plate 129 for directing the stream toward the discharge end or nose 130.

The amount of air issuing from the open or bag-receiving end of the nose 130 can be regulated, as by varying the position of the by-pass damper 131 having operating handle 132.

As soon as the operator positions a bag below the nose 130 by holding it loosely in substantially upright position, the air blast immediately distends the bag for reception of material as soon as door 41 opens. With this attachment, an operator can readily keep pace with the machine for there is ample time in the cycle for an operator to reach for a bag and move it beneath the nose 130.

This arrangement for opening the bags may be used with any of the other preceding modifications of Figs. 1 to 7.

In general, although I have illustrated preferred forms of my automatic weighing apparatus, it is to be understood that my invention is not limited thereto but is co-extensive in scope with the appended claims.

What I claim is:

1. An automatic weighing machine comprising a scale, a conveyor for feeding material to said scale, clutch mechanism operable when tripped to effect a predetermined movement of said conveyor, structure movable toward and from scale-locking position, clutch mechanism operable when tripped to effect a predetermined movement during which it trips said first clutch mechanism, and first moves said structure to scale-locking position and then away from said position, and means responsive to balance of the scale for tripping said second clutch mechanism.

2. A weighing machine including a scale having a receptacle for receiving solid material for weighing, conveyor means operative once for each cycle of the machine to feed at high rate to said receptacle for a fixed time, means for interrupting operation of said conveyor at the end of said fixed time whereby the amount of material progressively delivered to said receptacle and accumulated therein is insufficient to effect balance, continuously operating means for feeding material at low rate to said receptacle, and structure disposed out of the path of said material to said receptacle during operation of said conveyor means and movable to obstruct said path in response to balance of the scale.

3. An automatic weighing machine comprising a scale, means for feeding a stream of material to said scale comprising a conveyor and an inclined chute therefrom, brush structure, means for biasing said brush structure toward a position at which it dams the stream at the discharge end of the chute, a shaft, means for biasing said shaft to one position, a latch restraining movement of said shaft by said biasing means, a member connected to shaft and operable when said shaft is in its restrained position to prevent movement of said brush structure by its biasing means, a clutch comprising separable members, a member on said shaft preventing, when said shaft is in said restrained position engagement of said clutch members, lost-motion means operated by said clutch during engagement of said clutch members to move said shaft to its restrained position and said brush structure away from its chute-damming position, and means responsive to balance of said scale for releasing said latch to permit movement of said shaft by its biasing means to release said brush structure for movement by its biasing means and to effect engagement of said separable clutch members.

4. An automatic weighing machine suited for materials of widely different characters, sizes and shapes comprising a hopper for said material, a revolving disk below said hopper, a scale having a receptacle, a door for said receptacle, a conveyor belt adjacent the edge of said disk to feed a stream of material therefrom toward said scale receptacle, brush structure movable to a position at which it dams said stream on said conveyor, automatic means operative during its cycle to open said door, to close said door, and to move said brush structure from said damming position, and means responsive to balance of said scale effecting movement of said brush structure to said damming position and to initiate the cycle of said automatic means, said automatic means including delayed-action mechanism providing for opening of said door, discharge of the receptacle contents, and reclosure of said door while said brush structure is in damming position, and for movement of said brush structure from said damming position when said door is reclosed.

EDGAR W. BLEAM.